US012787141B2

(12) United States Patent
Nakaoka et al.

(10) Patent No.: US 12,787,141 B2
(45) Date of Patent: Nov. 3, 2026

(54) REAR TURN LAMP

(71) Applicant: Koito Manufacturing Co., Ltd., Tokyo (JP)

(72) Inventors: Hayato Nakaoka, Shizuoka (JP); Yuichi Nakazawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 19/197,157

(22) Filed: May 2, 2025

(65) Prior Publication Data

US 2025/0275040 A1 Aug. 28, 2025

Related U.S. Application Data

(63) Continuation of application No. PCT/JP2023/039697, filed on Nov. 2, 2023.

(30) Foreign Application Priority Data

Nov. 4, 2022 (JP) ................................ 2022-177657

(51) Int. Cl.
*H05B 47/165* (2020.01)
*B60Q 1/34* (2006.01)
(Continued)

(52) U.S. Cl.
CPC ............ *H05B 47/165* (2020.01); *B60Q 1/34* (2013.01)

(58) Field of Classification Search
CPC .................. H05B 45/375; H05B 45/38; H05B 45/3725; H05B 45/10; H05B 45/50; H05B 45/325;
(Continued)

(56) References Cited

U.S. PATENT DOCUMENTS

2017/0332452 A1* 11/2017 Lookman ............... H05B 45/54
2017/0359868 A1 12/2017 Kim et al.
(Continued)

FOREIGN PATENT DOCUMENTS

JP 2015-145224 A 8/2015
JP 2016-175582 A 10/2016
(Continued)

OTHER PUBLICATIONS

International Preliminary Report on Patentability (Form PCT/IB/373) and the Written Opinion of the International Searching Authority (Form PCT/ISA/237) issued on Apr. 29, 2025, by the International Bureau of WIPO in corresponding International Application No. PCT/JP2023/039697. (8 pages).
(Continued)

*Primary Examiner* — Wei (Victor) Y Chan
(74) *Attorney, Agent, or Firm* — Buchanan Ingersoll & Rooney PC

(57) ABSTRACT

When a turn synchronization signal stays high, and a sequential turn-on prohibition signal is negated, the first lamp unit sequentially turns on a plurality of first light emitting elements, and after completion of turning-on of the plurality of first light emitting elements, then transmits a turn-on instruction signal to the second lamp unit. When the turn synchronization signal stays high, and the sequential turn-on prohibition signal is asserted, the first lamp unit turns on the plurality of first light emitting elements at a time, and transmits the turn-on instruction signal to the second lamp unit. The second lamp unit turns on the second light emitting element, in response to the turn-on instruction signal.

4 Claims, 7 Drawing Sheets

(51) Int. Cl.

| | |
|---|---|
| ***H05B 45/10*** | (2020.01) |
| ***H05B 45/375*** | (2020.01) |
| ***H05B 45/38*** | (2020.01) |

(58) Field of Classification Search
CPC ........ H05B 45/59; H05B 45/20; H05B 45/48; H05B 45/37; H05B 45/345
See application file for complete search history.

(56) References Cited

U.S. PATENT DOCUMENTS

| | | | | |
|---|---|---|---|---|
| 2018/0054862 | A1 | 2/2018 | Takagimoto et al. | |
| 2018/0304804 | A1* | 10/2018 | Tatara .................. | B60Q 1/2603 |
| 2021/0039550 | A1 | 2/2021 | Miyashita et al. | |
| 2022/0262211 | A1* | 8/2022 | Ordone ................. | G09F 13/044 |
| 2022/0349544 | A1* | 11/2022 | Yamamoto ........... | B60Q 1/0058 |

FOREIGN PATENT DOCUMENTS

| | | | |
|---|---|---|---|
| JP | 2018-510093 | A | 4/2018 |
| WO | 2019/208545 | A1 | 10/2019 |

OTHER PUBLICATIONS

International Search Report (Form PCT/ISA/210) issued on Dec. 12, 2023, by the Japanese Patent Office in corresponding International Application No. PCT/JP2023/039697. (5 pages).

* cited by examiner

REAR TURN LAMP

BACKGROUND

1. Technical Field

The present disclosure relates to a vehicle lamp apparatus.

2. Description of the Related Art

Some vehicle lamp apparatuses (combination lamps, or simply referred to as rear lamps) arranged in the rear of an automobile extend across a moving part such as a trunk lid or a rear hatch, and a vehicle body. Each of this sort of rear lamps is formed by dividing it into a housing on the moving part and a housing on the vehicle body.

The rear lamp is provided with a turn lamp (turn signal lamp). Recent ongoing trend in some vehicles is to mount a turn lamp, which is structured to sequentially turn on so as to stream towards the direction of travel (referred to as a sequential turn lamp, hereinafter).

Some vehicles are equipped with an emergency stop signal (ESS) function which makes a hazard lamp blink at a high speed, to notify a following vehicle that an emergency brake was slammed on. However, it is undesirable for the vehicle adapted to the ESS function that the turn lamp sequentially turns on during the ESS illumination.

SUMMARY

The present disclosure has been arrived at considering such circumstances, wherein one of exemplary objects of a certain mode of the disclosure is to provide a separate-type rear turn lamp capable of canceling the sequential illumination.

A rear turn lamp according to one aspect of the present disclosure includes: a first lamp unit arranged in a moving part of a vehicle body, and containing a plurality of first light emitting elements; and a second lamp unit arranged in a stationary part of the vehicle body, and containing a second light emitting element. The first lamp unit can receive, from a vehicle, a turn synchronization signal and a sequential turn-on prohibition signal, and can transmit a turn-on instruction signal to the second lamp unit. The second lamp unit can receive the turn synchronization signal from the vehicle, and can receive the turn-on instruction signal from the first lamp unit. The first lamp unit is structured to (i) sequentially turn on the plurality of first light emitting elements when the turn synchronization signal stays high, and the sequential turn-on prohibition signal is negated, and after completion of turning-on of the plurality of first light emitting elements, to transmit the turn-on instruction signal to the second lamp unit, meanwhile structured to (ii) turn on the plurality of first light emitting elements at a time, and to transmit the turn-on instruction signal to the second lamp unit, when the turn synchronization signal stays high, and the sequential turn-on prohibition signal is asserted, and, the second lamp unit being structured to turn on the second light emitting element, in response to the turn-on instruction signal.

Note that also free combinations of these constituents, and also any of the constituents and expressions exchanged among the method, apparatus, and system, are valid as the modes of the present disclosure. Also note that the description of this section (SOLUTION TO PROBLEM) does not describe all essential features of the invention, and thus also subcombinations of these features described may constitute the invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Outline of Embodiments

Figure 1A:
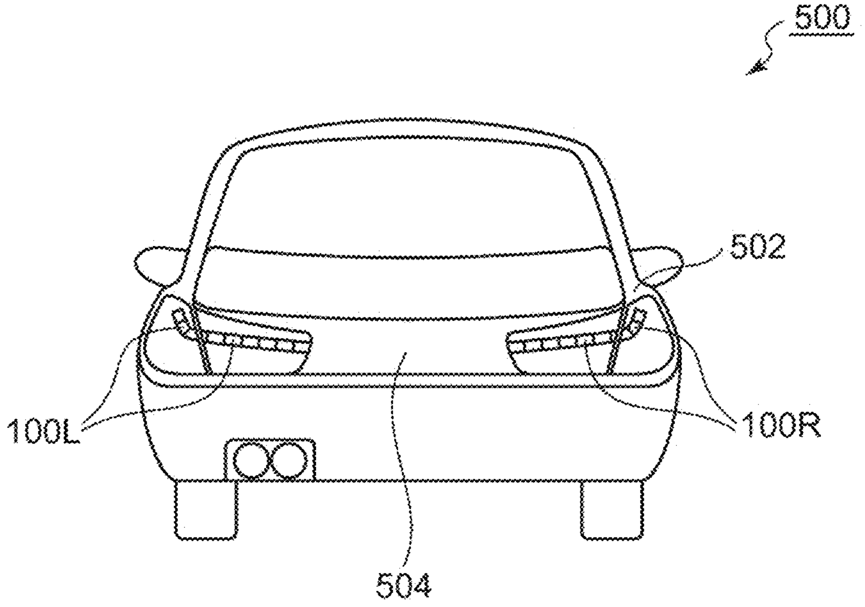
FIG. 1A is an external view of an automobile equipped with rear turn lamps.

Some exemplary embodiments of the present disclosure will be outlined. This outline is intended for briefing some concepts of one or more embodiments, for the purpose of basic understanding of the embodiments, as an introduction before detailed description that follows, without limiting the scope of the invention or disclosure. This outline is not an extensive overview of all possible embodiments, and is therefore intended neither to specify key elements of all embodiments, nor to delineate the scope of some or all of the embodiments. For convenience, the term "one embodiment" may be used to designate a single embodiment (Example or Modified Example), or a plurality of embodiments (Examples or Modified Examples) disclosed in the present specification.

A rear turn lamp according to one embodiment contains a first lamp unit arranged in a moving part of the vehicle body, and containing a plurality of first light emitting elements; and a second lamp unit arranged in a stationary part of the vehicle body, and containing a second light emitting element. The first lamp unit can receive, from a vehicle, a turn synchronization signal and a sequential turn-on prohibition signal, and can transmit a turn-on instruction signal to the second lamp unit. The second lamp unit can receive the turn synchronization signal from the vehicle, and can receive the turn-on instruction signal from the first lamp unit. The first lamp unit is structured to (i) sequentially turn on the plurality of first light emitting elements when the turn synchronization signal stays high, and the sequential turn-on prohibition signal is negated, and after completion of turning-on of the plurality of first light emitting elements, to transmit the turn-on instruction signal to the second lamp unit, meanwhile structured to (ii) turn on the plurality of first light emitting elements at a time, and to transmit the turn-on instruction signal to the second lamp unit, when the turn synchronization signal stays high, and the sequential turn-on prohibition signal is asserted, and, the second lamp unit being structured to turn on the second light emitting element, in response to the turn-on instruction signal.

This structure enables sequential illumination, while normally keeping the sequential turn-on prohibition signal negated. The sequential illumination is stopped upon assertion of the sequential turn-on prohibition signal, in case of a special event such as an emergency braking, thus immediately enabling normal blinking.

In one embodiment, the sequential turn-on prohibition signal may stay low when asserted, and may have high impedance when negated. The first lamp unit may contain a reception circuit for the sequential turn-on prohibition signal. The reception circuit may contain: an input pin to be coupled to receive the sequential turn-on prohibition signal; a capacitor connected to the input pin; a resistor having a first end grounded; and a PNP transistor having an emitter coupled to receive the turn synchronization signal, a base connected to the input pin, and a collector connected to a second end of the resistor.

In one embodiment, the sequential turn-on prohibition signal may stay low when asserted, and may have high impedance when negated. The first lamp unit may contain a reception circuit for the sequential turn-on prohibition signal. The reception circuit may contain: an input pin to be coupled to receive the sequential turn-on prohibition signal; a varistor connected to the input pin; a resistor having a first end grounded; and a PNP transistor having an emitter coupled to receive the turn synchronization signal, a base connected to the input pin, and a collector connected to a second end of the resistor. If a large capacitance were connected to the input pin, transition of the turn synchronization signal towards high would turn on the PNP transistor, since the emitter of the PNP transistor will have high voltage while the base remains at a low level. Now, the PNP transistor may be prevented from being turned on, by connecting a varistor whose capacitance is small, to the input pin.

In one embodiment, the first lamp unit contains: a converter powered by the turn synchronization signal, and is structured to supply a constant current to the plurality of first light emitting elements connected in series; a plurality of bypass switches connected in parallel with the plurality of first light emitting elements; and a turn-on control circuit powered by the turn synchronization signal, and is structured to sequentially turn off the plurality of bypass switches, upon transition of the turn synchronization signal to high, and to turn off the plurality of bypass switches at a time, upon assertion of the sequential turn-on prohibition signal.

EMBODIMENTS

Preferred embodiments will be explained below, referring to the attached drawings. All similar or equivalent constituents, members and processes illustrated in the individual drawings will be given same reference numerals, so as to properly avoid redundant explanations. The embodiments are merely illustrative, and are not restrictive about the invention. All features and combinations thereof described in the embodiments are not always necessarily essential to the disclosure and invention.

In the present specification, a “state in which a member A is coupled to a member B” includes a case where the member A and the member B are physically and directly coupled, and a case where the member A and the member B are indirectly coupled while placing in between some other member that does not substantially affect the electrically coupled state, or does not degrade the function or effect demonstrated by the coupling thereof.

Similarly, a “state in which member C is provided between member A and member B” includes a case where the member A and the member C, or the member B and the member C are directly connected, and a case where they are indirectly connected, while placing in between some other member that does not substantially affect the electrical connection state among the members, or does not degrade the function or effect demonstrated by the members.

FIG. 1A is an external view of an automobile 500 equipped with rear turn lamps 100. Rear turn lamps 100L and 100R are attached to the left rear and the right rear of the automobile 500, respectively. The automobile 500 has a stationary part 502 and a moving part 504. The moving part 504 may be a trunk lid as illustrated in FIG. 1A. Alternatively in another example, the moving part 504 may be a rear hatch gate. Each of the rear turn lamps 100 is arranged dividedly on the stationary part 502 and the moving part 504.

Figure 1B:
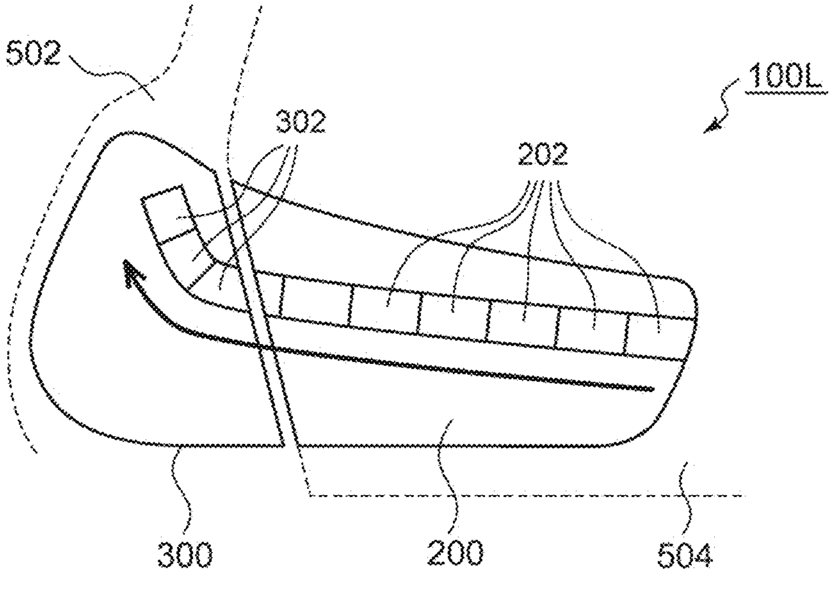
FIG. 1B is a drawing illustrating a left rear turn lamp.

FIG. 1B is a drawing illustrating the left rear turn lamp 100L. The rear turn lamp 100R is structured to be bilaterally symmetrical with the rear turn lamp 100L.

The rear turn lamp 100L is divided into a first lamp unit 200 and a second lamp unit 300. The first lamp unit 200 and the second lamp unit 300 have separate housings. The first lamp unit 200 is fixed to the moving part 504, and the second lamp unit 300 is fixed to the stationary part 502 adjoining to the moving part 504. The first lamp unit 200 may alternatively be referred to as an inner lamp unit, and the second lamp unit 300 may alternatively be referred to as an outer lamp unit.

The first lamp unit 200 and the second lamp unit 300 have respectively arranged therein a plurality of first light emitting elements 202 and a plurality of second light emitting elements 302, adjoined in a substantially horizontal direction. The rear turn lamp 100 L is a so-called sequential turn lamp, in which the plurality of light emitting elements 202, 302, when turning left, sequentially turns on in a direction indicated by an arrow, from the inside (right in the drawing) towards the outside (left in the drawing) of the vehicle body. Each light emitting element 202, although typically a light emitting diode (LED), may alternatively be some other semiconductor light source such as laser diode (LD) or organic electro luminescence (EL) element.

Figure 2:
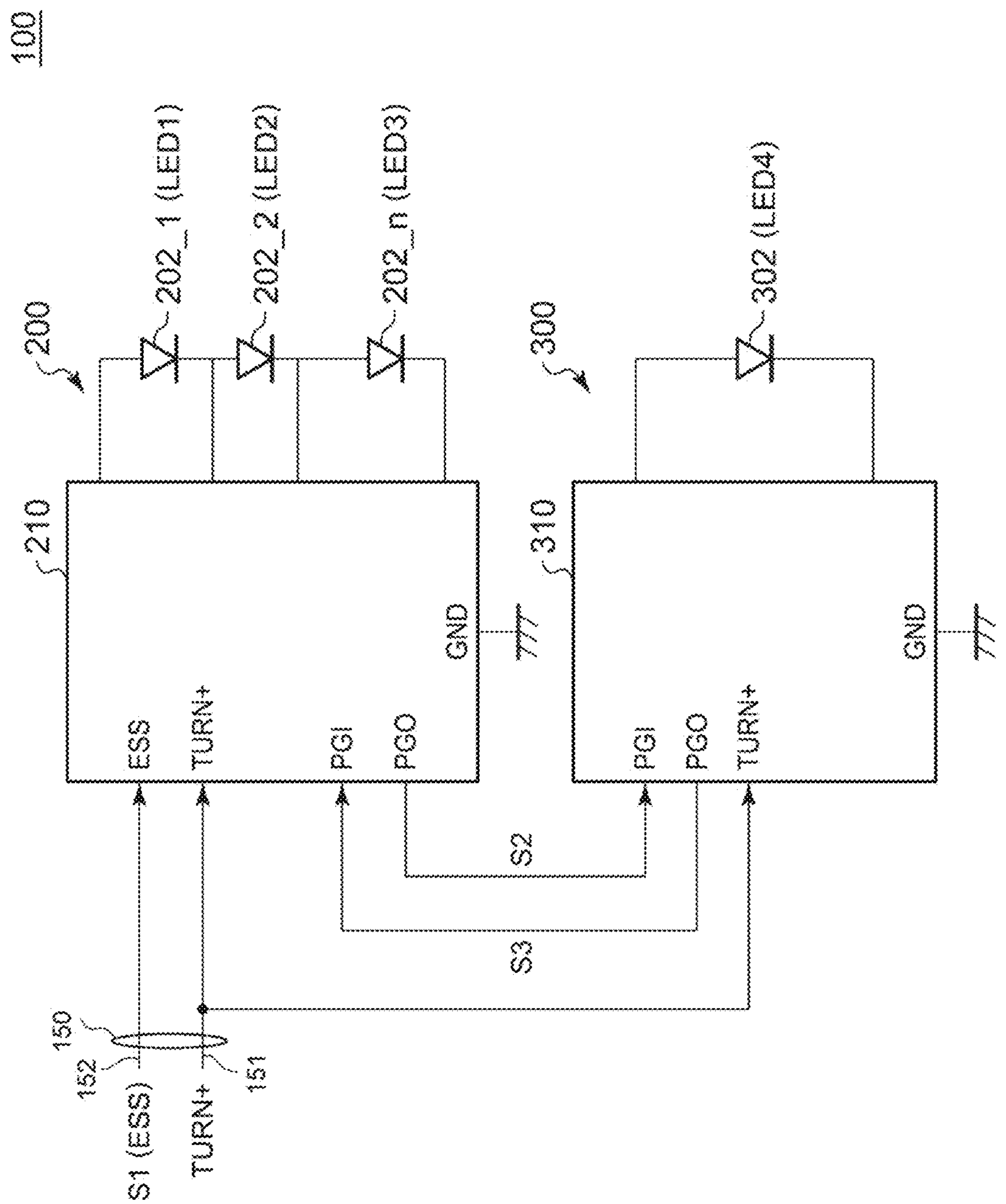
FIG. 2 is a block diagram illustrating the rear turn lamp according to an embodiment.

FIG. 2 is a block diagram illustrating the rear turn lamp 100 according to the embodiment. The rear turn lamp 100 has the first lamp unit 200 and the second lamp unit 300.

As described previously, the first lamp unit 200 is arranged in the moving part of the vehicle body, meanwhile the second lamp unit 300 is arranged in the stationary part of the vehicle body.

The first lamp unit 200 has a plurality n ($n \geq 2$) of first light emitting elements 202_1 to 202_*n* that can independently turn on or off, and a first drive module 210. The second lamp unit 300 has a second light emitting element 302, and a second drive module 310. Each of the first light emitting elements 202 and the second light emitting element 302 is a semiconductor light emitting element such as light emitting diode (LED).

The rear turn lamp 100 is connected through a vehicle harness 150 to an electronic control unit (ECU) mounted on the vehicle. The rear turn lamp 100 receives, from the vehicle side, a turn synchronization signal TURN+ and a sequential turn-on prohibition signal S1.

Turn-on instruction from the vehicle to the rear turn lamp 100 is given through a power line 151 of the vehicle harness, in the form of the turn synchronization signal TURN+. The turn synchronization signal TURN+, which serves as a main power supply for the rear turn lamp 100, is a pulse signal that stays high (battery voltage) in a turn-on period (ON) of the rear turn lamp 100, and stays low (ground voltage) in a turn-off period (OFF). Normally, the turn lamp blinks at a cycle of 1 to 2 Hz (60 to 120 times per minute). For example, the turn-on period lasts 666 ms at 1.5 Hz. The turn synchronization signal TURN+ stays high during the first 333 ms, and stays low during the second 333 ms.

The rear turn lamp 100 is allowed for sequential illumination by which the plurality of first light emitting elements 202 and the second light emitting element 302 sequentially turn on. More specifically, upon transition of the turn synchronization signal TURN+ to high, the light emitting elements 202_1, 202_2, . . . **202_*n*, and 302 sequentially turn on in this order, meanwhile upon transition of the turn synchronization signal TURN+ to low, all the light emitting elements 202_1, 202_2, . . . 202_*n*, and 302** turn off at a time.

The sequential turn-on prohibition signal S1 is a signal that instructs permission and prohibition of sequential illumination, and takes two states. If the sequential turn-on prohibition signal S1 stays in the first state (negated), the rear turn lamp 100 runs sequential illumination. If the sequential turn-on prohibition signal S1 stays in the second state (asserted), the rear turn lamp 100 does not run the sequential illumination, but upon transition of the turn synchronization signal TURN to high, then turns on the light emitting elements 202_1, 202_2, . . . **202_*n*, and 302 all at once, meanwhile upon transition of the turn synchronization signal TURN to low, then turns off the light emitting elements 202_1, 202_2, . . . 202_*n*, and 302** all at once.

The sequential turn-on prohibition signal S1 is asserted, for example, when the vehicle equipped with the rear turn lamp 100 applies the emergency brake and allows the hazard lamp to blink at high speed (emergency stop signal (ESS)). Alternatively, the sequential turn-on prohibition signal S1 may be asserted, in a case where all-at-once blinking is desired like before, regardless of emergency braking.

The sequential turn-on prohibition signal S1 may typically be an active-low signal that stays in a high impedance state when negated, and at a low level when asserted. Alternatively, the sequential turn-on prohibition signal S1 may be an active-high signal that stays in a high impedance state when negated, and at a high level when asserted. Again alternatively, the sequential turn-on prohibition signal S1 may be a binary signal that stays in a low level when negated, and in a high level when asserted.

The first drive module 210 of the first lamp unit 200 can receive the turn synchronization signal TURN+ and the sequential turn-on prohibition signal S1, from the vehicle. The first drive module 210 has a PGO pin connected to a PGI pin of the second drive module 310, thus enabling transmission of a turn-on instruction signal S2 to the second drive module 310 of the second lamp unit 300. The second drive module 310 can receive the turn synchronization signal TURN+ from the vehicle, and can receive the turn-on instruction signal S2 from the first lamp unit 200.

The second drive module 310 has a PGO pin connected to a PGI pin of the first drive module 210. If there is no abnormality in the second drive module 310 and the turn-on operation is completed, the second drive module 310 asserts a detection signal S3 (high voltage Hi, for example), and outputs it to the first drive module 210.

The first lamp unit 200 (*i*) sequentially turns on the plurality of first light emitting elements 202_1 to **202_*n* when the turn synchronization signal TURN+ stays high, and the sequential turn-on prohibition signal S1 is negated, and after completion of turning-on of the plurality of first light emitting elements 202_1 to 202_*n*, then transmits, to the second lamp unit 300, the turn-on instruction signal S2 that transitions to a predetermined state (asserted, which is typically high) at a timing the second light emitting element 302** should be turned on.

Meanwhile, the first lamp unit 200 (*ii*) turns on the plurality of first light emitting elements 202_1 to **202_*n* at a time, and immediately transmits the turn-on instruction signal S2 to the second lamp unit, upon detection of, and in response to, assertion of the sequential turn-on prohibition signal S1** during a period the turn synchronization signal TURN+ stays high.

The second lamp unit 300 turns on the second light emitting element 302, in response to the turn-on instruction signal S2.

The structure of the rear turn lamp 100 has been described. Next, operations thereof will be explained.

Figure 3:
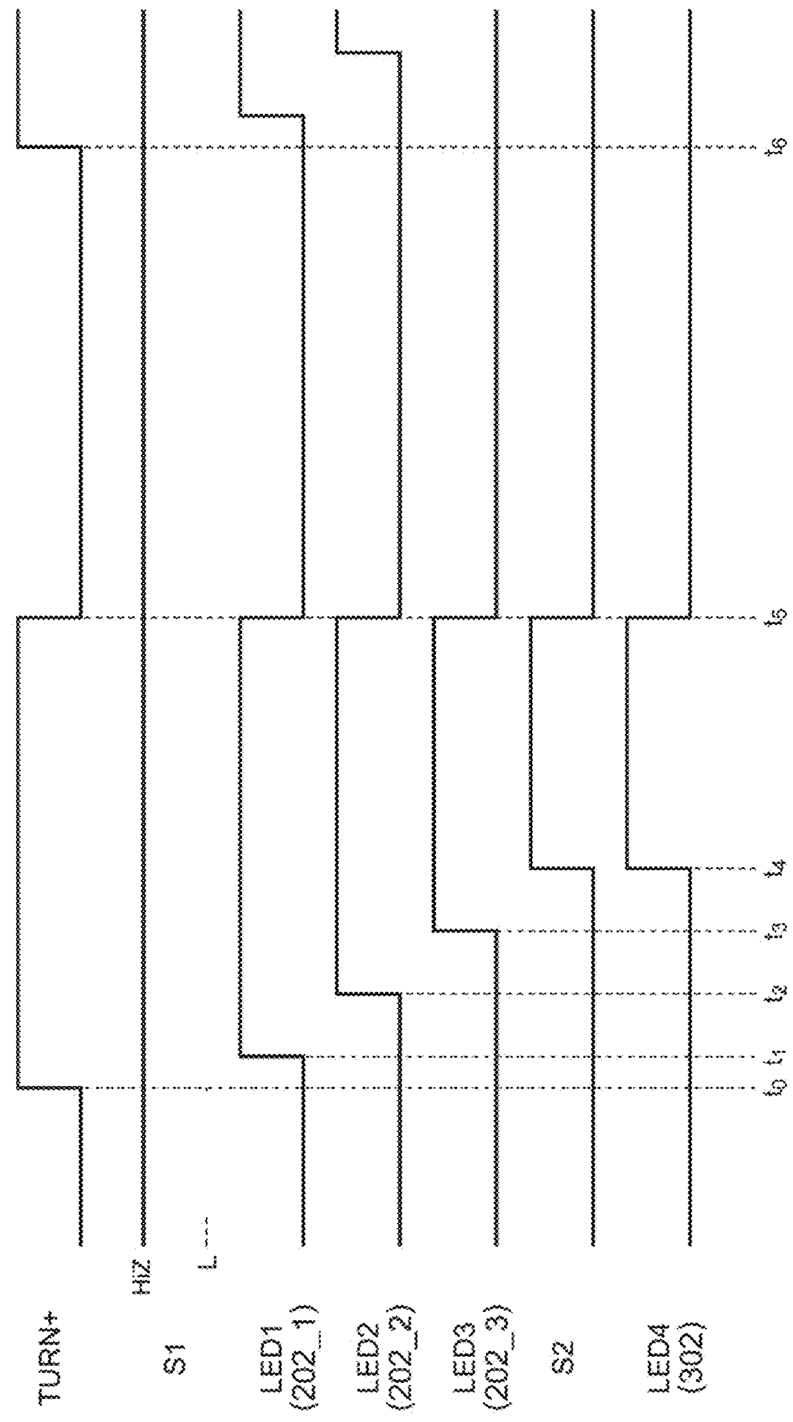
FIG. 3 is a timing chart illustrating operations of the rear turn lamp in a normal mode.

FIG. 3 is a timing chart illustrating operations of the rear turn lamp 100 in a normal mode. Assuming now the sequential turn-on prohibition signal S1 in this example stays in a high-impedance state (Hiz) under permission of the sequential illumination, meanwhile stays low (L) under prohibition of the sequential illumination. Also assuming now the number n of the first light emitting elements 202 in FIG. 2 is three; LED1, LED2 and LED3 represent turning-on (high)/off (low) of the first light emitting elements 202_1 to 202_3; and LED4 represents turning-on/off of the second light emitting element 302.

Upon transition of the turn synchronization signal TURN+ to high at time $t_0$, the first drive module 210 and the second drive module 310 are activated. Since the sequential turn-on prohibition signal S1 stays at high impedance Hiz, the first drive module 210 sequentially turns on the plurality of first light emitting elements 202_1 to 202_3 at times $t_1$, $t_2$, and $t_3$. The first drive module 210 then asserts the turn-on instruction signal S2, at time $t_4$ the second light emitting element 302 should be turned on. In response to assertion of the turn-on instruction signal S2, the second drive module 310 turns on the second light emitting element 302.

Upon transition thereafter of the turn synchronization signal TURN+ to low at time $t_5$, the first drive module 210 and the second drive module 310 will stop, and all the light emitting elements 202_1 to 202_3, and the second light emitting element 302 will turn off.

At time $t_6$ and thereafter, operations same as those at times $t_0$ to $t_6$ are repeated, in synchronization with the turn synchronization signal TURN+.

Figure 4:
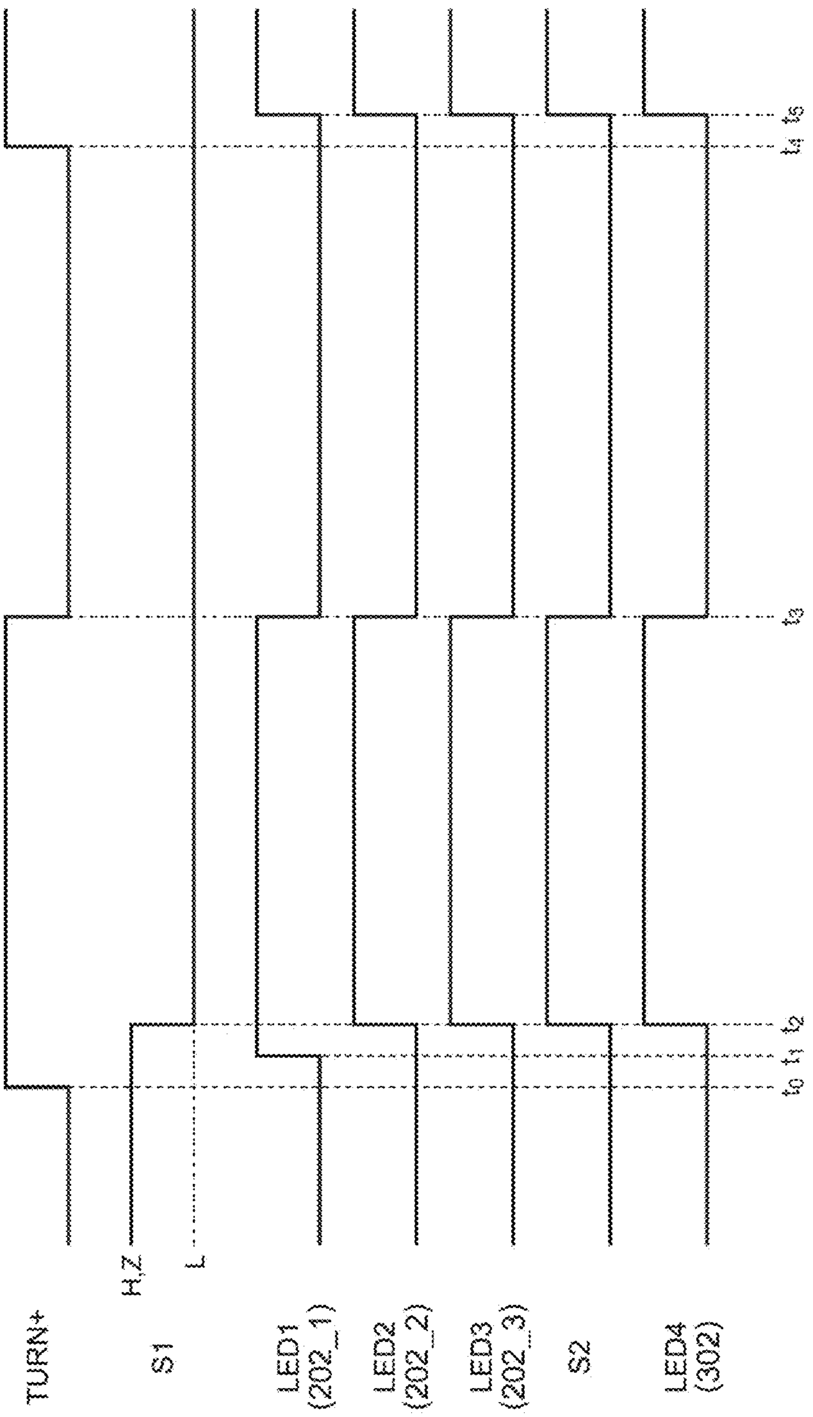
FIG. 4 is a timing chart illustrating operations of the rear turn lamp during a prohibited period of sequential illumination.

FIG. 4 is a timing chart illustrating operations of the rear turn lamp 100 during a prohibited period of sequential illumination.

Upon transition of the turn synchronization signal TURN+ to high at time $t_0$, the first drive module 210 and the second drive module 310 are activated. Initially, the sequential turn-on prohibition signal S1 stays at high impedance HiZ. At time $t_2$, which comes after time $t_1$ the first drive module 210 turns on the first light emitting element 202_1, the sequential turn-on prohibition signal S1 is asserted (low). Upon detection of assertion of the sequential turn-on prohibition signal S1, the first drive module 210 turns on all the light emitting elements 202_1 to 203_3, and further asserts the turn-on instruction signal S2. In response to assertion of the turn-on instruction signal S2, the second drive module 310 turns on the second light emitting element 302. Upon transition of the turn synchronization signal TURN+ to low at time $t_3$, the first drive module 210 and the second drive module 310 will stop, and all the light emitting elements 202_1 to 202_3, and the second light emitting element 302 will turn off.

At time $t_4$, the turn synchronization signal TURN+ transitions to high. Since the sequential turn-on prohibition signal S1 at this time has already been asserted, so that upon detection of assertion of the sequential turn-on prohibition signal S1, the first drive module 210 immediately turns on the first light emitting elements 202_1 to 202_3, and asserts the turn-on instruction signal S2 ($t_5$). In response to assertion of the turn-on instruction signal S2, the second drive module 310 turns on the second light emitting element 302.

The operation of the rear turn lamp 100 has been described. In this way, when the sequential turn-on prohibition signal S1 is asserted, the rear turn lamp 100 can stop the sequential illumination, and can turn on all the light emitting elements 202_1 to 202_3 and 302.

The present disclosure may be understood as illustrated in the block diagram illustrated in FIG. 2, and encompasses various apparatuses and methods derived from the foregoing explanations, without being limited to any specific structure. Hereinafter, more specific exemplary structures and Examples will be described to help understanding or to clarify the spirit or operations of the present disclosure, without narrowing the scope of the present disclosure.

Figure 5:
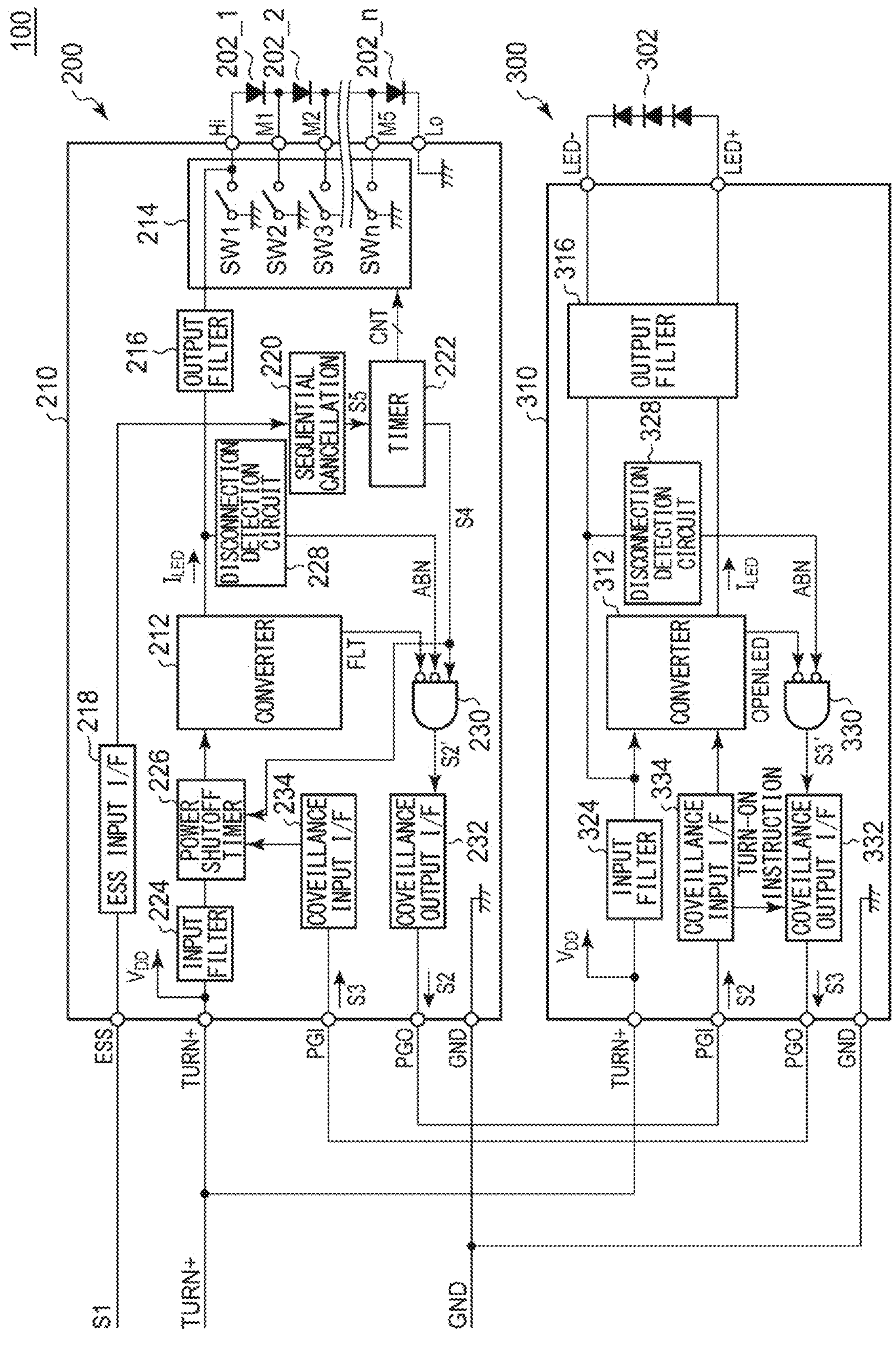
FIG. 5 is a block diagram illustrating an exemplary structure of the rear turn lamp.

FIG. 5 is a block diagram illustrating an exemplary structure of the rear turn lamp 100.

First, an exemplary structure of the first drive module 210 will be described. An input filter 224 removes noise in the turn synchronization signal TURN+ which serves as power supply and turn-on instruction for the first drive module 210. The turn synchronization signal TURN+ is supplied as source voltage $V_{CC}$, to the individual blocks of the first drive module 210.

A converter 212 transitions into an operation state, upon transition of the turn synchronization signal TURN+ to high. The converter 212 may typically be a step-up/down converter, structured to output, in the operation state, a drive current $I_{LED}$ stabilized at a predetermined target current level. Type (step-down, step-up, step-up/down) of the converter 212 is selectable, according to the number n of units of the first light emitting elements 202. An output filter 216 removes noise (ripple) contained in the drive current $I_{LED}$.

A bypass circuit 214 is connected to the first light emitting elements 202_1 to **202_*n*. The bypass circuit 214** is structured to be switchable among n+1 states φ0 to φn:

φ0: a state in which all the first light emitting elements 202 turn off;

φ1: a state in which only the first light emitting element 202_1 turns on;

φ2: a state in which the first light emitting elements 202_1 and 202_2 turn on;

φn−1: a state in which the first light emitting elements 202_1 to 202_(n−1) turn on; and φn: a state in which all the first light emitting elements 202_1 to **202_*n*** turn on.

For example, the bypass circuit 214 contains a plurality of switches SW1 to SWn. The i-th (i=1, 2, . . . n) switch SWi is connected between the anode of the corresponded first light emitting element **202_*i*** and the ground.

In the state $\varphi_0$, the switch SW1 is set ON. The switches SW2 to SWn may either be ON or OFF, now assumed to be ON.

In the state $\varphi_1$, the switch SW1 is set OFF, and the switch SW2 is set ON. The switches SW3 to SWn may either be ON or OFF, now assumed to be ON.

In the state $\varphi_2$, the switches SW1 and SW2 are set OFF, and the switch SW3 is set ON. The switches SW4 to SWn may either be ON or OFF, now assumed to be ON.

. . .

In the state φn, the switches SW1 to SWn−1 are set OFF, and the switch SWn is set ON.

A timer circuit 222 starts operation upon supply of the turn synchronization signal TURN+ (source voltage), and generates a control signal CNT for switching among the states φ0 to φn of the bypass circuit 214. The timer circuit 222 also asserts a timing signal S4 that indicates a timing at which the second light emitting element 302 of the second lamp unit 300 should be turned on.

A power shutoff timer 226 receives the timing signal S4 from the timer circuit 222, and the detection signal S3 that indicates completion of the turn-on operation from the second lamp unit 300. The power shutoff timer 226 determines that the second lamp unit 300 is abnormal, if assertion of the detection signal S3 that indicates completion of turning-on of the second drive module 310 is not detected, within a predetermined period after the timing signal S4 that indicates start of turning-on of the second drive module 310 is asserted, and turns off the first light emitting element 202 in the first lamp unit 200.

An ESS input interface circuit 218 is a reception circuit structured to monitor an electrical state of an input pin ESS for the sequential turn-on prohibition signal S1, and to determine assertion or negation of the sequential turn-on prohibition signal S1. Upon detection of assertion of the sequential turn-on prohibition signal S1, a sequential cancellation circuit 220 outputs a sequential cancellation signal S5 to the timer circuit 222. Upon input of the sequential cancellation signal S5, the timer circuit 222 generates the control signal CNT that causes transition of the bypass circuit 214 to the state φn, regardless of the elapsed time, and asserts the timing signal S4.

A disconnection detection circuit 228 detects, for example, disconnection abnormality of an output line of the converter 212. Upon detection of the abnormality, the disconnection detection circuit 228 asserts (high) an abnormality detection signal ABN. The converter 212 also has an abnormality detection function, and asserts (high) a fault signal FLT, upon detection of any internal abnormality.

A logic gate 230 subjects the timing signal S4, the abnormality detection signal ABN, and the fault signal FLT to logic operation, to generate a turn-on instruction signal S2'. The turn-on instruction signal S2' output herein is ascribed to the timing signal S4, if the abnormality detection signal ABN and the fault signal FLT stay low. If at least either the abnormality detection signal ABN or the fault signal FLT stays low, the turn-on instruction signal S2' is fixed to low.

A coveillance output interface circuit 232 receives the turn-on instruction signal S2', and outputs the turn-on instruction signal S2.

A coveillance input interface circuit 234 receives the detection signal S3 from the second drive module 310.

The structure of the first lamp unit 200 has been described. Next, a structure of the second lamp unit 300 will be described.

An input filter 324 removes noise in the turn synchronization signal TURN+ which serves as power supply and turn-on instruction for the second drive module 310. The turn synchronization signal TURN+ is supplied as source voltage $V_{CC}$ to the individual blocks of the second drive module 310.

A disconnection detection circuit 328 detects, for example, disconnection abnormality of an output line of a converter 312. Upon detection of the abnormality, the disconnection detection circuit 328 asserts (high) an abnormality detection signal ABN. The converter 312 also has an abnormality detection function, and asserts (high) an abnormality detection signal OPENLED, upon detection of any internal abnormality (open failure of load, for example).

A logic gate 330 subjects the abnormality detection signals ABN and OPENLED, to generate a detection signal S3'. The detection signal S3' is asserted, when at least either the abnormality detection signal ABN or the OPENLED is asserted. A coveillance output interface circuit 332 receives the detection signal S3', and outputs the detection signal S3.

A coveillance input interface circuit 334 receives the turn-on instruction signal S2 from the first drive module 210.

A converter 312 transitions into an operation state, upon transition of the turn synchronization signal TURN+ to high, and upon input of the turn-on instruction signal S2. The converter 312 may typically be a step-up converter, structured to output, in the operation state, a drive current $I_{LED}$ stabilized at a predetermined target current level. An output filter 316 removes noise (ripple) contained in the drive current $I_{LED}$.

The structure of the second lamp unit 300 has been described.

Figure 6:
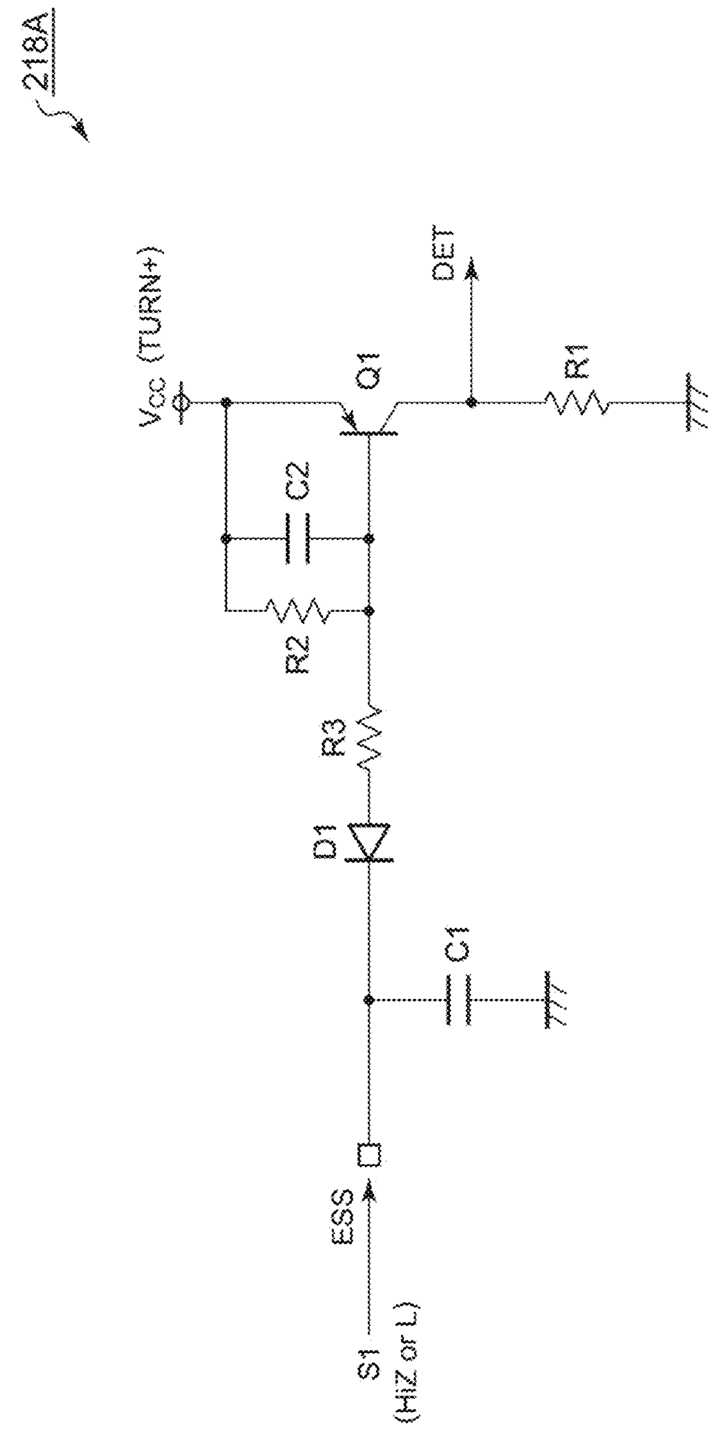
FIG. 6 is a circuit diagram of an ESS input interface circuit according to Example 1.

Next, an exemplary structure of the ESS input interface circuit 218 will be described. FIG. 6 is a circuit diagram of an ESS input interface circuit 218A according to Example 1. The sequential turn-on prohibition signal S1 stays low when asserted, and stays at high impedance HiZ when negated.

The ESS input interface circuit 218A contains a PNP transistor Q1, resistors R1 to R3, capacitors C1 and C2, and a diode D1.

The capacitor C1 is connected to the input pin ESS, for protection against electrostatic breakdown. A first end of the resistor R1 is grounded. The PNP transistor Q1 has a collector connected to the resistor R1, has an emitter to which the source voltage $V_{CC}$ is input, and a base connected via a resistor R3 and a diode D1 to the input pin ESS. Between the base and the emitters of the transistor Q1, there are connected the capacitor C2 and the resistor R2.

When the sequential turn-on prohibition signal S1 stays at high impedance (negated), the base of the transistor Q1 will be pulled up by the resistor R2, so that voltage between the base and the emitter of the transistor Q1 transitions to 0 V, and the transistor Q1 turns off. The ESS input interface circuit 218A will therefore give an output DET which stays low.

When the sequential turn-on prohibition signal S1 stays low (asserted), the base of the transistor Q1 transitions to 0 V, the transistor Q1 turns on, and the resistor R1 will have current that flows therethrough. The ESS input interface circuit 218A will therefore give the output DET which stays high.

The circuit illustrated in FIG. 6 is effective for a case where the capacitor C1 has small capacitance, and pulse rise rate of the turn synchronization signal TURN+ is slow.

In a case where the pulse rise rate of the turn synchronization signal TURN+ is fast, and/or the capacitance of the capacitor C1 is large, then the rise rate of the base voltage of the transistor Q1 will delay behind the rise time of the emitter voltage $V_{CC}$ of the transistor Q1, thus the voltage between the base and the emitter becomes high for a short time, the transistor Q1 turns on, and the output DET of the ESS input interface circuit 218A becomes instantaneously high. This would cause erroneous detection.

Figure 7:
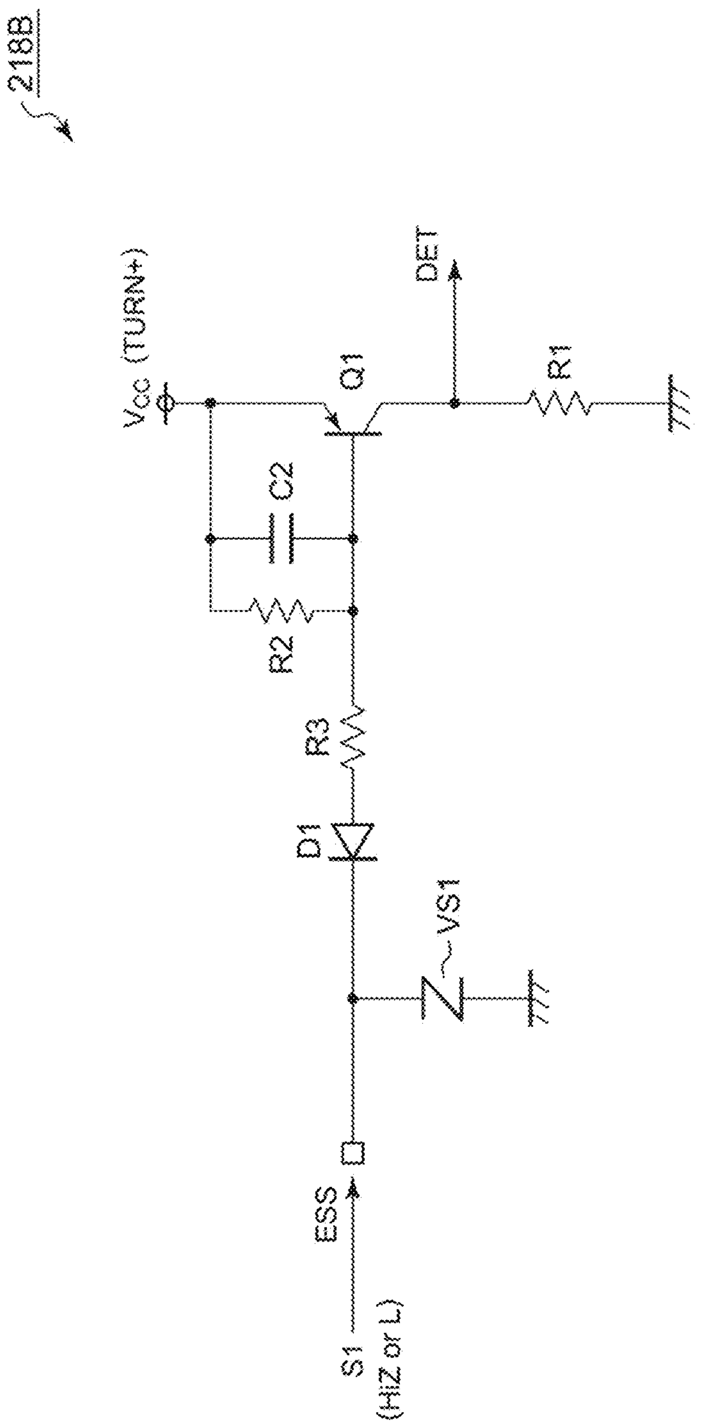
FIG. 7 is a circuit diagram of an ESS input interface circuit according to Example 2.

FIG. 7 is a circuit diagram of an ESS input interface circuit 218B according to Example 2. The ESS input interface circuit 218B contains a varistor VS1, in place of the capacitor C1 contained in FIG. 6. The varistor VS1 functions as an electrostatic breakdown prevention element for the input pin ESS. The varistor VS1 is selectable from components whose capacitance is smaller than that of the capacitor C1. Use of this sort of component makes it possible to accelerate rise up of the base (ESS pin) voltage of the transistor Q1, when the source voltage $V_{CC}$ rises up, thus successfully preventing erroneous detection.

Having described the present disclosure with use of specific terms referring to the embodiments, the embodiments merely illustrate the principle and applications of the present disclosure, allowing a variety of modifications and layout change without departing from the spirit of the present disclosure specified by the claims.

What is claimed is:

1. A rear turn lamp comprising:

a first lamp unit arranged in a moving part of a vehicle body, and containing a plurality of first light emitting elements; and a second lamp unit arranged in a stationary part of the vehicle body, and containing a second light emitting element;

the first lamp unit being structured to receive, from a vehicle, a turn synchronization signal and a sequential turn-on prohibition signal, and to transmit a turn-on instruction signal to the second lamp unit, the second lamp unit being structured to receive the turn synchronization signal from the vehicle, and to receive the turn-on instruction signal from the first lamp unit, the first lamp unit being structured to (i) sequentially turn on the plurality of first light emitting elements when the turn synchronization signal stays high, and the sequential turn-on prohibition signal is negated, and after completion of turning-on of the plurality of first light emitting elements, to transmit the turn-on instruction signal to the second lamp unit, meanwhile structured to (ii) turn on the plurality of first light emitting elements at a time, and to transmit the turn-on instruction signal to the second lamp unit, when the turn synchronization signal stays high, and the sequential turn-on prohibition signal is asserted, and, the second lamp unit being structured to turn on the second light emitting element, in response to the turn-on instruction signal.

2. The rear turn lamp according to claim 1, wherein the sequential turn-on prohibition signal stays low when asserted, and stays at high impedance when negated, the first lamp unit contains a reception circuit for the sequential turn-on prohibition signal, and, the reception circuit contains:

an input pin to be coupled to receive the sequential turn-on prohibition signal;

a capacitor connected to the input pin;

a resistor having a first end grounded; and a PNP transistor having an emitter coupled to receive the turn synchronization signal, a base connected to the input pin, and a collector connected to a second end of the resistor.

3. The rear turn lamp according to claim 1, wherein the sequential turn-on prohibition signal stays low when asserted, and stays at high impedance when negated, the first lamp unit contains a reception circuit for the sequential turn-on prohibition signal, and, the reception circuit contains:

an input pin to be coupled to receive the sequential turn-on prohibition signal;

a varistor connected to the input pin;

a resistor having a first end grounded; and a PNP transistor having an emitter coupled to receive the turn synchronization signal, a base connected to the input pin, and a collector connected to a second end of the resistor.

4. The rear turn lamp according to claim 1, wherein the first lamp unit contains:

a converter powered by the turn synchronization signal, and is structured to supply a constant current to the plurality of first light emitting elements connected in series;

a plurality of bypass switches connected in parallel with the plurality of first light emitting elements; and a turn-on control circuit powered by the turn synchronization signal, and is structured to sequentially turn off the plurality of bypass switches, upon transition of the turn synchronization signal to high, and to turn off the plurality of bypass switches at a time, upon assertion of the sequential turn-on prohibition signal.

* * * * *